Figure 1:
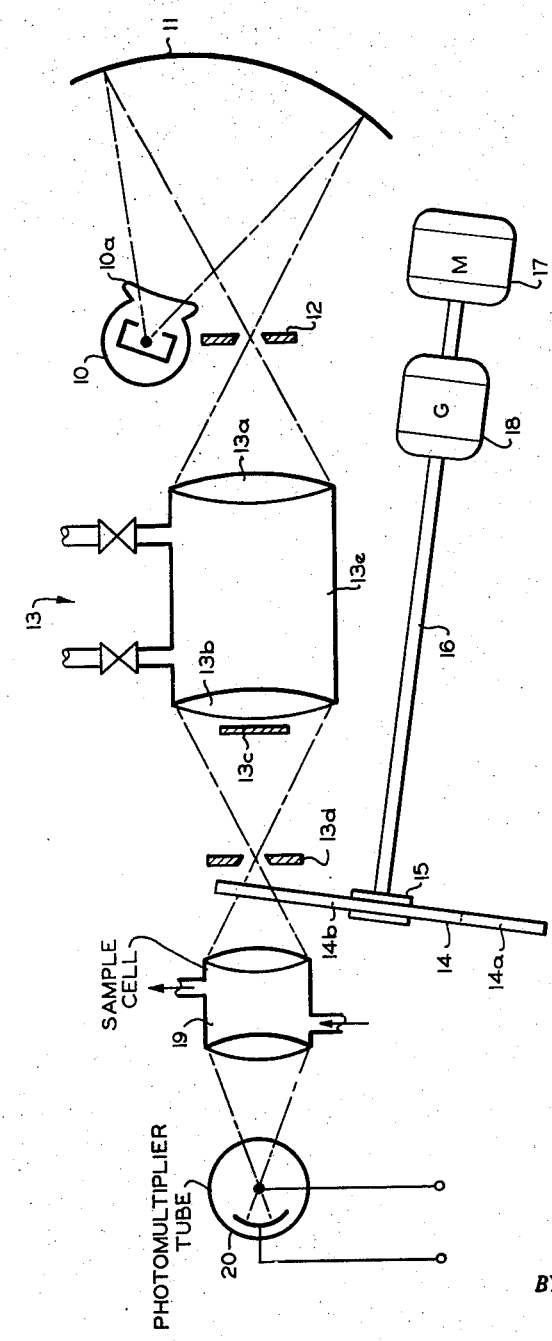

United States Patent Office 2,847,578
Patented Aug. 12, 1958

2,847,578

ULTRA-VIOLET ANALYZER

Hi W. Staten, Jr., Bartlesville, Okla., assignor to Phillips Petroleum Company, a corporation of Delaware Application December 31, 1954, Serial No. 479,072

9 Claims. (Cl. 250—43.5)

This invention relates to analyzers utilizing radiation. In another aspect, it relates to a system for obtaining synchronous rectification of an alternating current signal in such instruments. In still another aspect, it relates to a method of controlling a radiation sensitive device in such instruments.

In analytical analyzers, there is an optical arrangement capable of passing a radiation beam through a sample material, and an electric circuit for indicating or recording the beam intensity after it has passed through the sample material. In the analyzers of this invention, a rotating chopper device is provided in the radiation beam which, during alternating half-cycles of rotation, passes material opaque in the wavelength region absorbed by the sample component of interest into the path of the beam, and then interposes a material transparent in the aforesaid wavelength region in the path of the beam. In this manner, a rectangular wave output is produced, alternate ones of the rectangular waves varying in amplitude with variation in the concentration of the selected component in the sample stream. In order to record this signal, it is rectified and passed to a recorder device.

In accordance with this invention, an electrical generator is driven by the shaft of the chopper motor, and this generator provides a sine wave signal which is combined with the rectangular wave output of the radiation detector to provide a rectified signal which, after filtering, can be fed directly to a recorder unit. In this manner, a substantial improvement in signal to noise ratio is obtained, and a non-critical system is provided which is readily adjustable and provides very accurate analyses.

Moreover, in accordance with the invention, a control circuit is provided in conjunction with the radiation detector, which can be a photomultiplier tube, to the end that the average current through the detector is maintained constant, thus avoiding variations in output signal resulting from changes in radiation intensity, fogging of cell windows and other upsets in the operation of the optical system.

Accordingly, it is an object of the invention to provide an analyzer of improved character.

It is a further object to provide a synchronous rectifier system for an analyzer utilizing a chopper wherein the comparison voltage for a synchronous rectifier is derived from a generator driven by the shaft of the chopper motor.

It is a still further object to provide a system wherein the average current through the radiation detector is maintained constant.

It is a still further object to provide an instrument which is reliable in operation, accurate, and utilizes a minimum number of standard circuit components.

Figure 2:
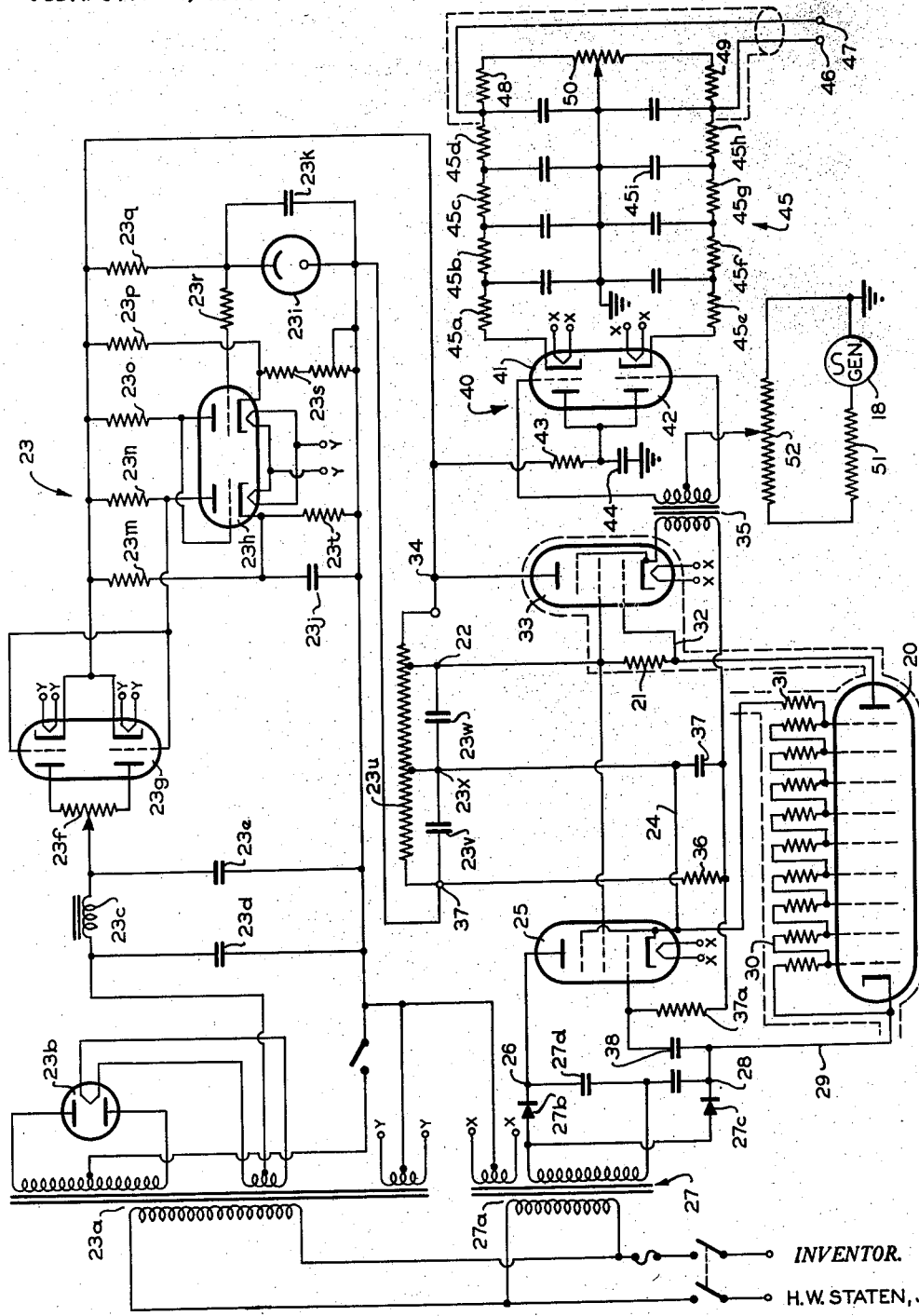

Various other objects, advantages and features of the invention will become apparent from the following detailed description taken in conjunction with the accompanying drawings, in which:

Figure 1 is a schematic view of the optical system of an analyzer constructed in accordance with the invention; and Figure 2 is a schematic circuit diagram of the analyzer of Figure 1.

Although the invention will be described in connection with an ultraviolet analyzer, it will be understood that various other types of radiation can be employed where a chopped radiation beam is utilized, and that various types of radiation detectors can be employed, other than a photomultiplier tube.

Referring now to Figure 1, I have provided a radiation source 10 which, as shown, is a hydrogen lamp producing ultraviolet radiation in the wavelength region of 2000 to 3500 angstrom units. The radiation beam emerges from a small opening 10a at the side of the lamp and is reflected by a mirror 11 onto an entrance aperture or assembly 12, which can be a disk having a small circular opening therein. In a practical embodiment of the invention, an effort was made to utilize the opening 10a itself as the entrance aperture 12 but it was found that the radiation from the lamp was not from a sufficiently confined area, and there was too much flickering beyond the edges to permit accurate operation. Accordingly, the mirror 11 was provided to establish a secondary source in which the source area is specifically defined.

The radiation beam passes from the aperture 12 through a focal isolation monochromator 13. This unit includes a pair of lenses 13a, 13b, a circular mask 13c and an exit aperture 13d. This latter aperture can also be defined by a disk having a small circular opening therein. The mask 13c intercepts the axial rays passing through the center of the lens assembly and, due to the chromatic aberration effect of the lenses, radiation of different wavelengths have different focal points with respect to the exit aperture 13d. Consequently, the mask 13c and aperture 13d block out wavelengths of higher and lower than a predetermined value so that a monochromator of low resolution is provided. In particular, the unit 13 cuts out wavelengths higher than about 2800 angstrom units. Advantageously, the interior of a cell 13e defined by the lenses and a cylindrical body portion is filled with a filter material, such as chlorine gas. This material has a cut-off wavelength at 2750 angstrom units and eliminates the critical adjustment of the aperture 13d and mask 13c which would otherwise be necessary to obtain the desired cut-off frequency.

Where butadiene is to be analyzed for, this material in small quantities provides a lower cut-off eliminating the necessity for critical adjustment of the unit 13.

Thus, the radiation beam leaving the aperture 13d contains only selected wavelengths of ultraviolet radiation. Inserted in the path of the beam is a chopper disk 14 which is secured by fixtures 15 to a shaft 16 driven by a chopper motor 17. For a purpose to be explained in detail later, the shaft 16 is connected to and drives an alternating current electrical generator 18.

Where butadiene is to be analyzed for, the disk 14 has a quartz section 14a and a Vycor section 14b which are alternately passed into the path of the radiation beam. Vycor is a glass manufactured by Corning Glass Works, Corning, New York, containing approximately 96% silicon dioxide and having ultraviolet transmission characteristics approximating those of butadiene. Although fused quartz can be used, crystalline quartz is preferred because it has superior ultraviolet transmission characteristics.

It will be evident that rotation of the disk 14 alternately places the quartz section 14a and Vycor section 14b in the path of the radiation beam which then traverses a sample cell 19 and passes to a radiation detector 20 which, in the example shown, is a photomultiplier tube.

It will be evident that the signal received by the tube 20 consists of alternate rectangular waves. Assuming that the sample to be analyzed for is butadiene, the amount of this component in the cell 19 will not affect the output when the Vycor section 14b is in the path of the beam since, as stated, Vycor has approximately the same absorption characteristics as butadiene. However, when the quartz section 14a is in the path of the beam, the amount of radiation incident upon the tube 20 will vary in accordance with the absorption of radiation by the butadiene which, in turn, varies with the amount of butadiene present. Thus, alternate rectangular waves will have an amplitude varying with the quantity of butadiene present while the other rectangular wave will not be affected by the quantity of this material present. The over-all amplitude of all the rectangular waves will, of course, vary somewhat with changes of intensity at the source, fogging of the cell windows, and the like.

In the light of the foregoing description, it will be understood that the system is not restricted to analyzers utilizing ultraviolet radiation, as similar phenomena are observed when analyzing other types of samples with infrared radiation or even visible radiation. Moreover, the type of monochromator 13 and filters utilized will vary depending upon the nature of the material to be analyzed for.

Referring now to Figure 2, it will be noted that the anode of the photomultiplier tube 20 is connected through a load resistor 21 to a positive terminal 22 of a regulated power supply generally indicated by reference numeral 23. This power supply has a neutral terminal 23x which is connected through a lead 24, and the anode and cathode of a regulator tube 25 to a positive terminal 26 of a high voltage power supply generally indicated by reference numeral 27, this supply having a negative terminal 28 which is connected by a lead 29 to the cathode of the tube 20. Thus, the power supplies 23 and 27 are connected in series to furnish anode voltage for the tube 20.

The tube 20 further has a plurality of series connected "dynode" resistors 30 which are connected between the cathode of tube 20 and a series resistance 31 connected to the cathode of tube 25.

The anode of tube 20 is further connected by a lead 32 to the control grid of a tube 33 connected in a cathode follower circuit. The anode of tube 33 is connected to a positive power supply terminal 34 of the supply 23, and its screen grid is connected to terminal 22 along with the screen grid of tube 25. The cathode of tube 33 is connected through the primary winding of a transformer 35 and a series resistance 36 to a negative bias terminal 37 of the supply 23. The lower terminal of this primary winding is also connected through a filter condenser 37 to neutral terminal 23x and through an isolation resistance 37a to the control grid of tube 25.

The parts just described constitute a regulating circuit which maintains a constant average current through the tube 20, thus balancing out changes in over-all average radiation intensity caused, for example, by gradual fluctuations in intensity of the source 10, Figure 1, or changes resulting from fogging of the cell windows or passage of opaque particles of material through the sample cell. In this connection, it will be observed that an increase in average current through the tube 20 resulting, for instance, from an increase in intensity of the radiation source causes an increase in the direct current voltage drop across the resistor 21 and a corresponding decrease in the direct current grid voltage impressed upon the tube 33. This produces a decrease in the cathode voltage of tube 33 and, consequently, an increase in the bias impressed upon the control grid of tube 25, thus reducing the current flow through this tube. This decreased current flow, in turn, reduces the current flow through the series dynode resistances 30, it being noted that these series resistances are connected in series with tube 25, and the terminals 26 and 28 of power supply 27. This, in turn, decreases the voltage difference per stage on the dynodes of tube 20 and decreases the current amplification of the tube, thus decreasing the average current through the tube to its original value. An opposite effect occurs in the case of an incipient decrease in current through the tube 20. Accordingly, the action of the circuit maintains this current at a constant value with the resulting advantages in operation heretofore noted.

The alternating current, i. e., rectangular wave signal, from tube 20 is impressed upon the primary winding of transformer 35, through tube 33, a cathode follower.

This alternating current signal is fed from the secondary winding of the transformer 35 to a synchronous rectifier unit 40 which includes two tubes 41 and 42 having their control grids connected to the respective end terminals of the secondary winding of transformer 35. The anodes of these tubes are both connected through a series resistance 43 to the positive power supply terminal 34, a grounded bypass capacitor 44 being provided in this circuit.

The cathodes of the tubes 41, 42 are connected through a filter 45 to output terminals 46 and 47 which, in turn, can be connected to a conventional direct current recorder. The filter 45 includes a set 45a to 45d of series resistances connected between the anode of tube 41 and output terminal 47, a set 45e to 45h of series resistances connecting the cathode of tube 42 to output terminal 46, and a series of grounded filter condensers 45i. The output circuit can be balanced to provide a zero output with zero input by a voltage divider connected between output terminals 46 and 47, this unit including fixed resistances 48, 49 and a potentiometer 50, the contactor of which is grounded.

In accordance with the invention, the comparison voltage for the rectifier 40 is obtained from the generator 18 which, as previously noted, is driven by the shaft 16, Figure 1, of the chopper motor 17. To this end, one terminal of the generator is connected through a fixed resistance 51 to a fixed terminal of a potentiometer 52, the other fixed terminal of which is grounded, as is the other terminal of generator 18. The contactor of potentiometer 52 is connected to a center-tap on the secondary winding of the transformer 35.

In this manner, a sine wave reference voltage for the synchronous rectifier is obtained to the end that, after rectification and filtering, the resulting direct voltage is accurately proportional to the alternating component of the anode current of the tube 20. This reference voltage is larger than the input signal to the synchronous rectifier, usually by a ratio of about 2:1, and synchronous detection is obtained since the phase relationship between the reference voltage and the alternating input voltage is constant, due to the connection of the generator 18 to the shaft of the chopper motor. This provides essentially a narrow band amplifier which is substantially free from drift and detuning which operates so as to cancel out the noise components over a period of time which is long compared to the period of the reference voltage. The adjustment of phase just mentioned can be made by varying the angular position of the generator 18 with respect to the shaft 16.

For purposes of completeness, referring again to Figure 2, it will be noted that the regulated power supply 23 includes a power transformer 23a, full wave rectifier 23b, filter choke 23c, filter condensers 23d, 23e, potentiometer 23f, series tube 23g having its control grid voltage determined by a regulator tube 23h connected to reference voltage tube 23i, together with related condensers 23j, 23k and resistors 23m to 23t, bleeder resistance 23u and condensers 23v, 23w. The power supply 27 includes a power transformer 27a, selenium rectifiers 27b, 27c, condensers 27d, 27e and the filter condenser 38.

In the over-all operation of the system, radiation from the source 10, Figure 1, passes through unit 13, chopper disk 14 and sample cell 19 to the photomultiplier tube 20. The filter unit 13 restricts the radiation to a band which includes those wavelengths where radiation is strongly absorbed by the component to be analyzed for. In the case of butadiene, this wavelength range can be from 2200 to 2600 angstrom units. In the case of other components of interest, such as hydrogen sulfide, for example, other wavelength bands can be utilized, either in the ultraviolet region or other regions of the spectrum.

The action of the chopper disk 14 provides alternate cycles of operation in which the radiation beam is first sensitive to the amount of the component of interest present in the sample cell 19 and then insensitive thereto, thus producing a rectangular wave output at the detector 20 in which the relative amplitudes of adjacent rectangular waves vary in accordance with the amount of the component of interest in the sample, although the over-all amplitude of the waves may vary in accordance with changes in source intensity, fogging of cell windows, or passage of solid objects through the cell. These latter variations are compensated for by maintaining the average current through the tube 20 at a substantially constant level due to the action of tubes 33 and 25 which reduce the voltage drop between the electrodes of tube 20 if the total current therethrough tends to increase and increases the voltage drop between the electrodes if the total current through the tubes tends to decrease. This action is effected by control of the bias on tube 25 in accordance with changes of anode direct current of tube 33 which, in turn, is controlled by the direct voltage impressed upon its control grid as determined by the direct current component of the voltage drop across the load resistor 21.

Thereupon, the alternating rectangular wave component of the output of the tube 20 is rectified and converted into a direct voltage by the action of the synchronous rectifier 40, the comparison voltage for which is supplied by the generator 18. This unit operates in exact synchronism with the incoming signal due to the connection thereof to the shaft of the chopper motor 17, Figure 1.

In this manner, a direct voltage output is obtained which is accurately representative of the concentration of the component of interest in the sample, and variations in this output signal due to changes in source intensity, fogging of the cell windows, and passage of solid objects through the cell are effectively eliminated.

While the invention has been described in connection with a present, preferred embodiment thereof, it is to be understood that this description is illustrative only and is not intended to limit the invention.

I claim:

1. In an analyzer, in combination, a radiation source, a radiation detector arranged to receive a single beam of radiation from said source, means for interposing a sample to be analyzed in the path of said beam, chopping mechanism arranged in the path of said beam to cyclically interpose in said beam material transparent at a wavelength where radiation is strongly absorbed by a component of interest in said sample and then a material substantially opaque at said wavelength, but capable of transmitting radiation at other wavelengths means for driving said chopping mechanism, a synchronous rectifier connected to said radiation detector, a generator connected to and driven by said driving means to produce an electrical voltage synchronized with the operation of said chopping mechanism, means for feeding the voltage produced by said generator to said synchronous rectifier in opposition to the voltage fed thereto from said radiation detector, and indicating means responsive to the output of said synchronous rectifier.

2. In a butadiene analyzer, a source of ultraviolet radiation, a photomuliplier tube arranged to receive a single beam of radiation from said source, a sample cell in the path of said beam incorporating a sample containing butadiene, filter means in said beam arranged to pass a band of radiation having a wavelength of 2200 to 2600 angstrom units and to exclude radiation of other wavelengths, a rotatable chopper disk in the path of said beam having a quartz section transparent to said band of radiation and a section of glass containing about 96 percent silicon dioxide having ultraviolet transmission characteristics approximating those of butadiene opaque to said band of radiation, a shaft connected to said chopper disk, a motor connected to said shaft to rotate same, a generator driven by said shaft to produce an electrical voltage synchronized with the operation of said chopper disk, a synchronous rectifier, means for feeding the voltage produced by said generator to said synchronous rectifier, in opposition to the voltage of said photomultiplier tube, and indicating means responsive to the output of said synchronous rectifier.

3. In a butadiene analyzer, a source of ultraviolet radiation, a photomultiplier tube arranged to receive a single beam of radiation from said source, a sample cell in the path of said beam incorporating a sample containing butadiene, filter means in said beam arranged to pass a band of radiation having a wavelength of 2200 to 2600 angstrom units and to exclude radiation of other wavelengths, a rotatable chopper disk in the path of said beam having a quartz section transparent to said band of radiation and a section of glass containing about 96 percent silicon dioxide having ultraviolet transmission characteristics approximating those of butadiene opaque to said band of radiation, a shaft connected to said chopper disk, a motor connected to said shaft to rotate same, a generator driven by said shaft and constructed and arranged to produce a sinusoidal output voltage synchronized with the shaft rotation, a synchronous rectifier including a pair of triodes, a transformer having its primary winding connected to said photomultiplier tube and its secondary winding connected to the respective control grids of said tubes, leads connecting said generator to a center-tap on the secondary winding of said transformer, a filter connected in the anode-cathode circuits of said tubes, indicating means connected to the output of said filter, and means for maintaining constant the average current flowing through said photomultiplier tube.

4. In a butadiene analyzer, a source of ultraviolet radiation, a photomultiplier tube having a set of dynode resistors, and arranged to receive a single beam of radiation from said source and a load resistor, means for effecting a flow of current through said dynode resistors, a sample cell in the path of said beam incorporating a sample containing butadiene, filter means in said beam arranged to pass a band of radiation having a wavelength of 2200 to 2600 angstrom units and to exclude radiation of other wavelengths, a rotatable chopper disk in the path of said beam having a quartz section transparent to said band of radiation and a section of glass containing about 96 percent silicon dioxide having ultraviolet transmission characteristics approximating those of butadiene opaque to said band of radiation, a shaft connected to said chopper disk, a motor connected to said shaft to rotate same, a generator driven by said shaft and constructed and arranged to produce a sinusoidal output voltage synchronized with the shaft rotation, a synchronous rectifier including a pair of triodes, a transformer having its primary winding connected to said photomultiplier tube and its secondary winding connected to the respective control grids of said tubes, leads connecting said generator to a center-tap on the secondary winding of said transformer, a filter connected in the anode-cathode circuits of said tubes, indicating means connected to the output of said filter, a control tube having its control grid connected to said load resistor so as to respond to the current flowing through said photomultiplier tube, and means connected to said control tube to vary the flow of current through said dynode resistors in such fashion as to maintain a constant current through said photomultiplier tube.

5. In an analyzer, in combination, a radiation source, a photomultiplier tube arranged to receive a beam of radiation from said source, a sample cell in said beam, chopping mechanism arranged to cyclically filter out of said beam radiation of wavelengths corresponding to a principal absorption band of a component of interest in said sample, a load resistor connected to said photomultiplier tube, means for supplying an operating voltage to said tube through said load resistor, a set of dynode resistors connected to said photomultiplier tube, a vacuum tube having an anode, a cathode, and a control grid, a voltage source, means for connecting said voltage source in series with the anode-cathode circuit of said vacuum tube and said dynode resistors, a control tube having at least an anode, a cathode and a control grid, a lead connecting the control grid of said control tube to said load resistor, an output transformer connected in the cathode circuit of said control tube, a lead connecting said primary winding to the control grid of said vacuum tube, and indicating means connected to the secondary winding of said transformer.

6. In an analyzer, in combination, a photomultiplier tube, a sample cell, a radiation filter having an entrance aperture and an exit aperture, said parts all being in optical alignment, a hydrogen lamp, an opaque casing surrounding said lamp and having a circular opening formed therein to project therefrom a beam of ultraviolet radiation, and a mirror arranged to cast an enlarged image of the filament of said hydrogen lamp upon said entrance aperture.

7. In an analyzer, in combination, a radiation source, a photomultiplier tube arranged to receive radiation from said source, means for interposing a sample to be analyzed into the path of said radiation beam to vary the output of said tube, a monochromator disposed in the path of radiation passing from said source to said tube, said monochromator including an elonagted housing, lenses at the respective ends of said housing, a disk of opaque material adjacent the lens nearest said tube, an exit slit spaced from said lens nearest the tube whereby the disk and slit exclude radiation outside a predetermined wavelength band, and a filter fluid within said housing having a radiation absorption band at wavelengths near and including one end of the wavelength band transmitted by said monochromator.

8. In an analyzer, in combination, a radiation source, a photomultiplier tube arranged to receive radiation from said source, means for interposing a sample to be analyzed into the path of said radiation beam to vary the output of said tube, a monochromator disposed in the path of radiation passing from said source to said tube, said monochromator including an elongated housing, lenses at the respective ends of said housing, a disk of opaque material adjacent the lens nearest the tube, an exit slit spaced from said lens nearest the tube whereby the disk and slit exclude radiation outside a predetermined wavelength band, and a filter fluid within said housing having a radiation absorption band at wavelengths near and including one end of the wavelength band transmitted by said monochromator, said sample to be analyzed having a radiation absorption band adjacent to and including the other end of the wavelength band transmitted by said monochromator, whereby critical adjustment of the exit slit and opaque disk is avoided.

9. In an analyzer, in combination, a radiation source, a radiation detector arranged to receive radiation from said source, means for interposing a sample to be analyzed in the path of said radiation, a chopper arranged in the path of said radiation, said chopper being constructed and arranged to produce an output of rectangular wave form from said detector, means for driving said chopper, a generator connected to said driving means, a synchronous rectifier connected to said detector to receive the output thereof, means for feeding a voltage from said generator to said synchronous rectifier so that said rectifier operates in synchronism with the incoming rectangular waves, means producing an output representative of the total radiation incident upon said detector, and means connected to said detector and responsive to the output of said last-named means to vary the output of said detector and thus compensate it for changes in said total radiation.

References Cited in the file of this patent

UNITED STATES PATENTS

| 2,503,165 | Meyer | Apr. 4, 1950 |
|---|---|---|
| 2,605,430 | Marcy | July 29, 1952 |
| 2,614,226 | Davis | Oct. 14, 1952 |
| 2,679,184 | Atwood | May 25, 1954 |
| 2,680,989 | Savitzky | June 15, 1954 |
| 2,707,238 | Fromm | Apr. 26, 1955 |
| 2,758,215 | Skarstrom | Aug. 7, 1956 |